June 22, 1926.
H. N. NORTHROP
1,590,116
DEVICE FOR LOADING WASHERS INTO HEEL MOLDS
Filed July 3, 1924     2 Sheets-Sheet 2
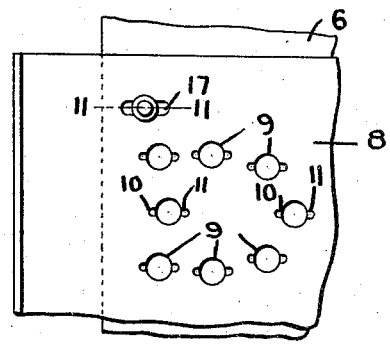
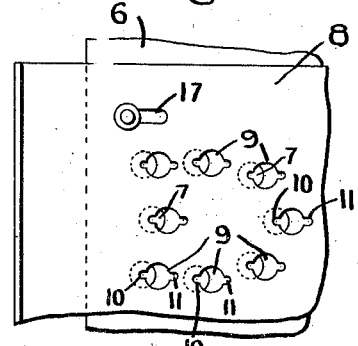
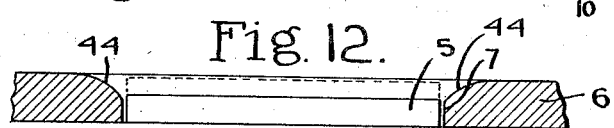
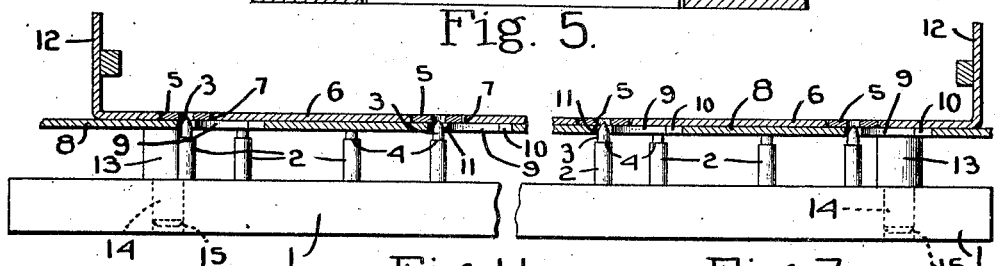
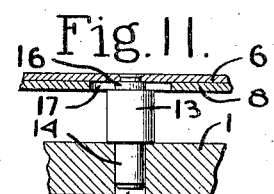
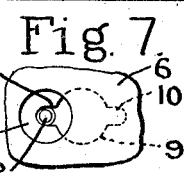
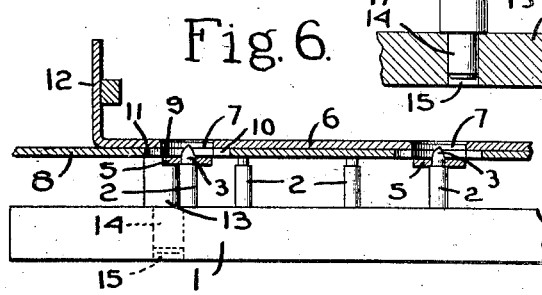
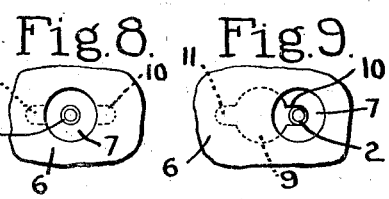
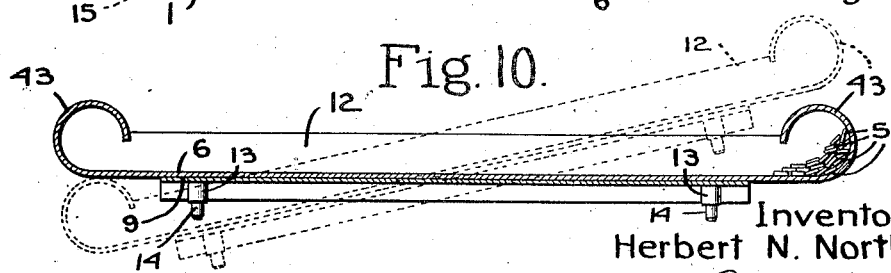
Inventor.
Herbert N. Northrop
by Heard Smith & Tennant
Attys.

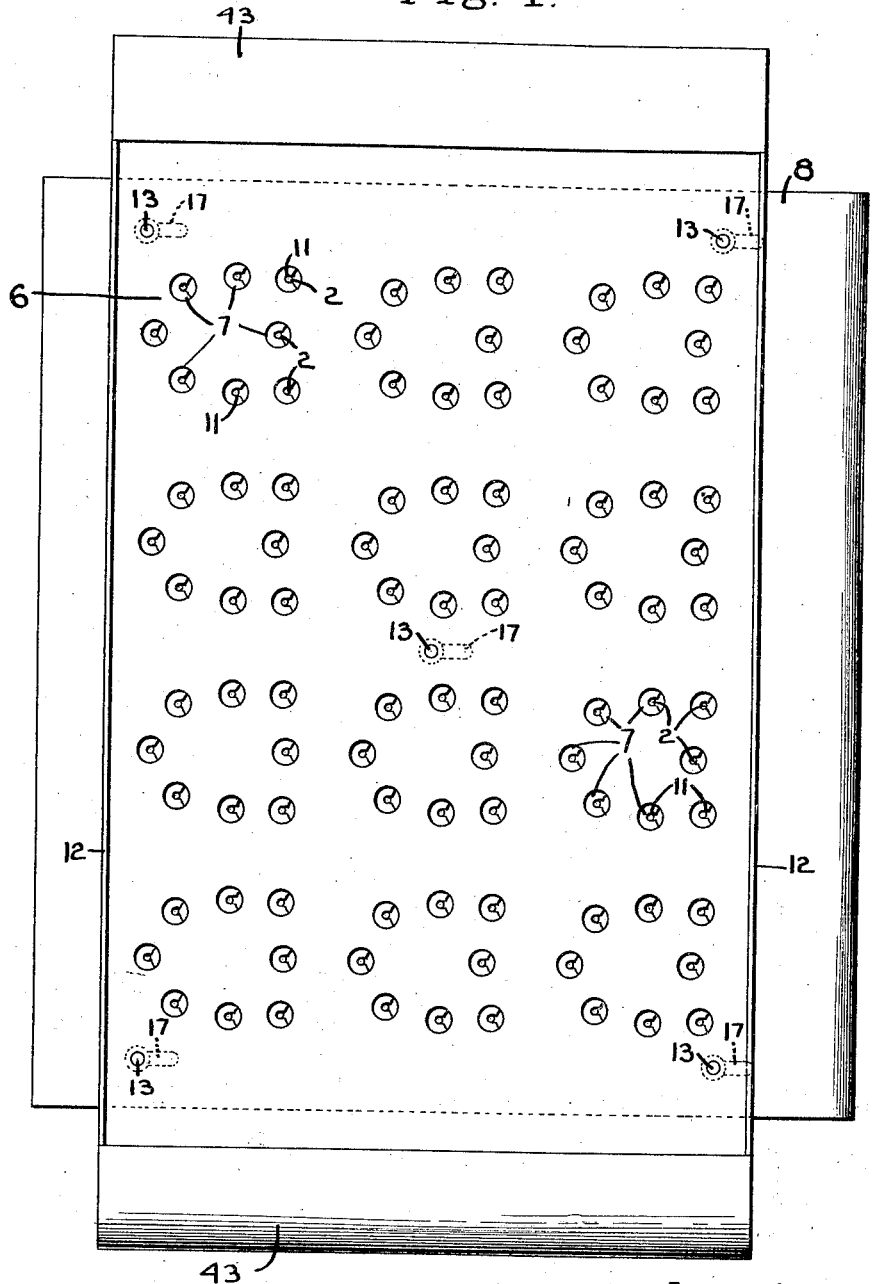

Patented June 22, 1926.

1,590,116

UNITED STATES PATENT OFFICE.

HERBERT N. NORTHROP, OF SOMERVILLE, MASSACHUSETTS, ASSIGNOR, BY MESNE ASSIGNMENTS, TO EDWARD B. CARTER, OF BOSTON, MASSACHUSETTS.

DEVICE FOR LOADING WASHERS INTO HEEL MOLDS.

Application filed July 3, 1924. Serial No. 723,879.

This invention relates to a device for loading washers into the molds in which rubber heels are made.

In the manufacture of rubber heels it is customary to use molds which are provided with washer-receiving pins on which washers are placed before the mold is filled with rubber so that when the rubber heel is molded the washers on the pins will become embedded into the rubber.

An object of my invention is to provide a device for thus placing the washers on the pins, which device is simple and relatively inexpensive to manufacture and is also not only easy to operate but accurate in its operation.

A further object of the invention is to provide a device of this type which is adapted for loading washers into a single mold or into a gang mold.

My improved device comprises a washer-positioning member having a plurality of washer-receiving openings that are situated in line with the pins in the mold and which are so positioned that the pins project into the openings, and a delivery plate situated beneath the washer-positioning member and having apertures therein that have the same relative arrangement as the apertures in the washer-positioning member, said delivery plate being shiftable to bring the apertures therein into and out of line with the apertures in the positioning plate. Since the delivery plate is beneath the positioning plate and the pins extend into the apertures in the latter said pins will pass through the delivery plate.

In using the device the delivery plate is positioned so that the apertures therein are out of alignment with the apertures in the positioning plate and when in this position a washer is loaded into each of the apertures in the positioning plate, said washers at this time resting on the delivery plate.

Since the washer-receiving pins project into the apertures in the positioning plate it follows that when said apertures are all filled with washers the washer-receiving pins will project slightly into the holes in the washers, while the latter are in the apertures in the positioning plate and resting on the delivery plate.

After the apertures in the positioning plate have thus all been filled with washers the delivery plate is shifted to bring its apertures therein in alignment with the apertures in the positioning plate at which time the washers will gravitate through the apertures in the delivery plate and onto the pins. Inasmuch as the ends or points of the pins are partly entered into apertures in the washers while the latter are in the positioning plate it follows that during the gravitating movement of the washers through the delivery plate they will simply slide down the pins and, therefore, cannot become dislodged.

This feature of having the pins extending into the apertures in the positioning plate so that said pins will partly enter the washers while they are in said apertures is an important feature of my invention in that it ensures that the washers will be correctly deposited on the pins when the delivery plate is shifted with its apertures into alignment with those of the positioning plate.

Another feature of my invention relates to a novel construction by which the loading of the washers into the apertures in the positioning plate may be facilitated. This is accomplished by making the positioning member in the form of a tray which is removable from the mold and into which a large number of washers may be placed so that the washers may be loaded into the apertures by simply giving the tray a few tipping movements, each sufficient to cause the washers to slide from one end to the other thereof. In thus moving across the tray the washers will drop into the apertures.

Another feature of the invention relates to a novel construction by which washers of different thicknesses can be successfully loaded into a heel mold.

In the drawings:

Fig. 1 is a plan view of a device embodying my invention;

Figs. 2 and 3 are fragmentary under side views of a portion of the delivery plate and positioning plate;

Fig. 4 is a perspective view of one of the washers which is used in the heel;

Fig. 5 is an enlarged fragmentary section on the line 5—5, Fig. 1, showing the washers loaded into the apertures in the positioning plate;

Fig. 6 is a similar view showing the delivery plate in position to deliver the washers to the pins;

Fig. 7 is an enlarged fragmentary plan view showing the relative position of the apertures in the positioning plate and delivery plate while the washers are being loaded into the apertures in the positioning plate.

Fig. 8 is a similar view showing the delivery plate in position to deliver the washers to the pins;

Fig. 9 is a similar view showing another position of the delivery plate;

Fig. 10 is a view of the tray removed from the mold and illustrating the manner in which the washers may be loaded into the positioning plate;

Fig. 11 is an enlarged section on the line 11—11, Fig. 2;

Fig. 12 is an enlarged sectional view through the aperture in the positioning plate illustrating the construction which will accommodate different thicknesses of washers.

The molds which are sometimes used for molding rubber heels comprise a base section carrying washer-receiving pins and a body section placeable on the base section and forming therewith a mold cavity. Sometimes these molds are single molds and sometimes they are gang molds, that is, molds constructed to mold a plurality of heels at one operation.

The operation of placing the washers on the washer-receiving pins is frequently performed before the two parts of a two-part mold are assembled and in the present drawings for the sake of clearness I have illustrated simply the base of the mold with the washer-receiving pins, it being understood that the complete mold will also involve a body which forms with the base a mold cavity or cavities.

This mold base is indicated at 1 and it has a plurality of washer-receiving pins 2 rising therefrom, each of which has the pointed end 3 and is provided with the usual shoulder 4 on which the washer is placed, one of said washers being indicated at 5 in Fig. 4. The mold base herein shown is for a gang mold adapted to mold twelve heels and it will, therefore, have twelve groups of pins 2, the pins of each group being properly arranged relative to each other to receive the washers for a single heel.

My device for loading the washers onto the pins comprises a positioning member 6 which is preferably in the form of a tray and which is provided with a plurality of washer-receiving apertures 7 that have the same relative arrangement as the pins 2, said tray being so positioned relative to the mold that the apertures 7 are in line with and directly over the pins, and so that the points 3 of the pins project slightly into the apertures.

Associated with the washer-positioning tray is a delivery plate 8 which is situated beneath the tray and is shiftable relative thereto. This delivery plate 8 is also provided with apertures 9 which have the same relative arrangement as the apertures 7 and the shifting movement of the delivery plate 8 is such that the apertures 9 may be placed either out of line with the apertures 7 or in line therewith. The pointed ends 3 of the washer-receiving pins project through the delivery plate 8 as clearly seen in Figs. 5 and 6.

Each aperture 9 in the delivery plate is provided at one end with a notch 11 which receives the corresponding pin 2 when the apertures 7 and 9 are out of alignment with each other as shown in Fig. 7. When in this relative position the delivery plate 8 forms a bottom to the aperture 7 and constitutes a support for the washer which fills said aperture. The washer-positioning member 6 will preferably have such a thickness that only one washer can be received at any one time in each aperture 7.

In using the device the delivery plate will be moved to one extreme limit of its movement as for instance shown in Figs. 1 and 7 and a washer 5 will then be placed in each of the apertures 7, said washers resting on said plate. Inasmuch as the pointed ends 3 of the pins 2 project into the apertures 7 said pointed ends of the pins will extend into the holes of the washers occupying the apertures 7 as clearly seen in Fig. 5. When each of the apertures 7 has a washer therein the delivery plate 8 is shifted to bring the apertures 9 therein in alignment with the apertures 7 as shown in Fig. 6 at which time the washers will gravitate through the apertures 9 onto the shoulders 4 of the pins.

Since the points of the pins enter the holes of the washers when the latter are in the apertures of the positioning plate the gravitating movement of the washers onto the pins is in fact merely a sliding movement of the washers down the pins. This construction ensures that the washers will invariably be deposited on the pins and precludes any possibility that they will miss pins in their transfer from the positioning plate 6 through said delivery plate 8. After the washers have gravitated through the apertures 9 in the delivery plate the latter may be shifted into the position shown in Fig. 9, in which case the delivery plate will be provided with notches 10 opposite the notches 11 to receive the pins 2. In either position the apertures 7 are partially closed by the delivery plate so that said apertures can be again loaded with washers.

The operation of loading the washers into the heel mold, therefore, consists merely in filling the apertures 7 with the washers and then moving the delivery plate 8 into the position shown in Fig. 6.

The loading of the washers into the apertures 7 of the positioning member may be accomplished in various ways without departing from the invention.

As stated above this positioning member is in the form of a tray, it having the side walls 12 and the end walls 43. One way of loading the washers into the apertures 7 would be to place a large number of washers into the tray and then by means of a brush or some instrument move the washers back and forth over the bottom of the tray until each aperture contained a washer.

Another way would be to place a large number of washers in the tray and then to give the tray a few tilting movements so that the washers would slide over the tray from one end to the other thereof, during which sliding movement they will find the apertures 7. In order to provide for this I propose to make the tray and the delivery plate associated therewith removable from the mold.

The tray is provided with shouldered posts 13 which are rigid therewith and depend therefrom, the lower reduced ends 14 of these posts being adapted to fit into the apertures 15 formed in the mold. The upper end of the posts 13 are shown as having the necked portions 16 which extend through slots 17 formed in the delivery plate 8 and said posts, therefore, serve not only as a means for supporting the tray but also for guiding the delivery plate in its shifting movement. With this construction the tray 6 and its associated delivery plate can be readily removed from the mold and if a large number of washers are placed loosely in the tray the latter may be tilted first in one direction and then in the other so that the washers will slide back and forth over the bottom of the tray. During this sliding movement the apertures 7 will be quickly filled with washers and when the apertures are thus filled the tray may be replaced and the delivery plate 8 shifted to deliver the washers onto the pins 2.

In order to obviate danger of the washers becoming spilled from the tray during the tilting movement I propose to make the end walls 43 thereof curved upwardly and downwardly as shown in Fig. 9, these curved walls thus forming pockets in which the washers 5 are received as they slide over the tray when it it tilted.

In order to accommodate washers of different thicknesses I propose to make the washer-positioning member 6 with a thickness at least as great as the thickest washers which is to be used and then to bevel the edges of the apertures 7 as shown at 44 in Fig. 12. With this construction even if a thin washer such as shown in full lines in Fig. 12 is employed yet the bevelled edge 24 will prevent a second washer from being deposited in the aperture on top of the thin washers for said second washer will simply slide over the thin washer and out of the flaring mouth of the aperture. By thus flaring the mouth of each aperture 7, therefore, it is possible to successfully use this device with washers of varying thickness.

I claim:

In a device of the class described, the combination with a heel mold having a plurality of washer-receiving pins, of a washer-positioning plate provided with washer-receiving apertures, a washer-delivering plate also having similarly spaced apertures and shiftable relative to the positioning plate to bring its apertures into and out of alignment with those of the positioning plate, and means for supporting the two plates with the aperture in the positioning plate in alignment with the pins and with the pins partially entering said apertures, said positioning plate having flanges at opposite ends curved upwardly and downwardly to form troughs to receive and retain the washers when the plate is tilted for the purpose of filling the apertures therein with washers.

In testimony whereof, I have signed my name to this specification.

HERBERT N. NORTHROP.